April 19, 1927.  1,625,477
W. P. LEAHY
ELECTRIC CORD ANCHORAGE
Filed Aug. 5, 1922
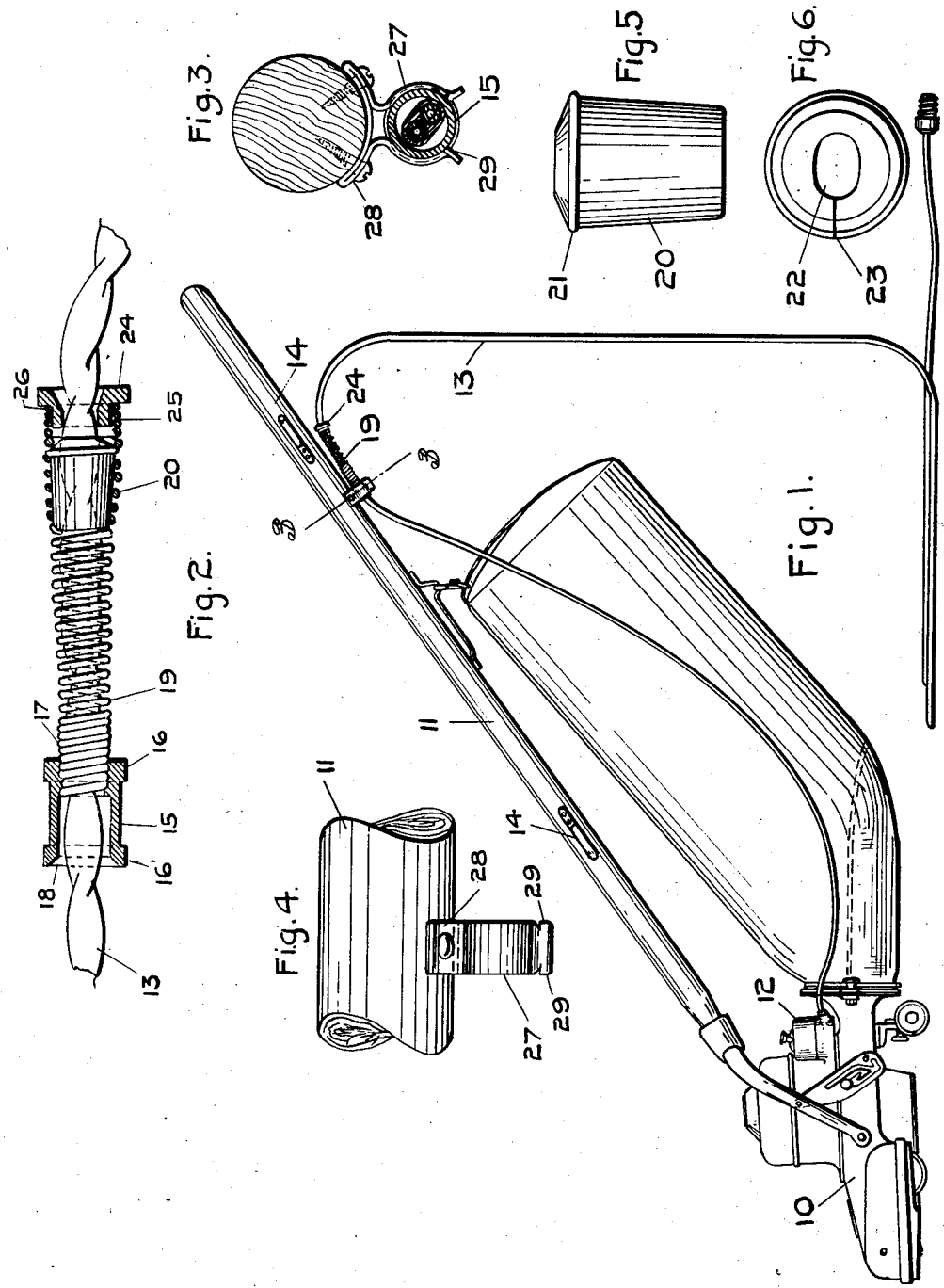
Inventor
William P. Leahy
By H. S. Dumaree
Attorney Patented Apr. 19, 1927.

1,625,477

UNITED STATES PATENT OFFICE.

WILLIAM P. LEAHY, OF CANTON, OHIO, ASSIGNOR, BY MESNE ASSIGNMENTS, TO THE HOOVER COMPANY, OF NORTH CANTON, OHIO, A CORPORATION OF OHIO.

ELECTRIC-CORD ANCHORAGE.

Application filed August 5, 1922. Serial No. 579,973.

My invention relates to improvements in electric cord anchorage for suction-sweepers, though obviously the particular anchorage might be used in many other circumstances. The situation is that electric suction-sweepers have to have an electric cord supplying the current to the motor. This cord leads from the wall plug to the apparatus and as the apparatus is moved, changes in tension on the cord occur. It has been customary in the past to surround the cord where it enters the switch housing with a coiled wire spring which while yielding and flexible, makes it impossible to sharply and suddenly bend the cord and thus break the cord or the insulation. It has also been customary to wind the cord on clips on the cleaner when the apparatus is not in use, but since the cord does not fasten on to the cleaner at the same point as the handle, it frequently happens that the user will wind the cord in the working position and then try to lift the handle to the vertical or storage position, which pulls the cord from the switch.

My invention provides means making sure that the cord will, when wound on the handle be always wound at the proper place so there will be sufficient free length to make it possible to tip the handle into the storage position and put the machine away. It would be possible to anchor the cord on the handle rigidly and permanently but if this were done it would be difficult to disassemble the machine for shipment or long storage and would make repairs difficult.

I overcome these objections by providing a stop fixed on the cord but removable from the handle, so that there is always sufficient length of cord between the handle and the machine to permit of manipulation, and release of the cord from the handle in case occasion should arise for so doing. In co-operation with this I also provide means for protecting the cord against breaking.

My invention, therefore, relates to an anchorage for a cord for suction-cleaners, but it might be for other electrical apparatus as well where electric cords are moved about.

In order that those skilled in the art may have a full and complete understanding of my invention, I have illustrated a preferred embodiment of the same in the accompanying drawings, in which—

Figure 1 is a side-elevation of a suction-sweeper showing the cord and associated parts in place;

Figure 2 is a partial section on an enlarged scale through the anchorage and cord spring with the cord in position;

Figure 3 is a section along the line 3—3 of Figure 1 on an enlarged scale;

Figure 4 shows a section of the handle with the holding clip in position;

Figure 5 is an elevation of the lock member; and

Figure 6 is a plan view of the lock member.

In these drawings like parts are indicated by like reference characters throughout the views thereof.

10 is a suction-sweeper of the usual well-known type supplied with a handle 11 and a control switch 12. 13 is a conductor terminating at one end in the switch and adapted at the other end to be connected to any suitable source of electric power. 14 are clips on the handle about which the cord is wound when the machine is not in use.

At a short distance from the switch end of the conductor is a spool or thimble 15. This spool or thimble 15 is cylindrical in form with flanges 16, 16′ at the ends. Thimble 15 is internally threaded at one end as at 17 and counterbored as at 18.

Fitting the threads 17 of thimble 15 is a cord protector spring 19 and inserted within cord protector spring 19 is the cord lock 20 which is formed with a taper to fit inside spring 19. This cord lock 20 on the larger end of which is a small bead 21 is formed with a central longitudinal elliptical hole 22 of proper dimensions to firmly grip the conductor cord and is longitudinally slit as at 23 so that it may be readily placed around the conductor cord.

24 is a bushing adapted to be inserted into the larger end of protector spring 19, the external diameter of its portion 25 being slightly greater than the internal diameter of the spring for insertion of the bushing. The bushing has a small groove at 26 which receives the upper coil of the spring.

The cord lock is assembled as follows:

Protector spring 19 is screwed into thimble 15 and then the conductor cord is passed through these members. Cord lock 20 of rubber, leather, or other appropriate material is placed on the conductor cord and pushed into the larger end of the protector spring after which bushing 24 is inserted in the larger end of the protector spring, slightly compressing the cord lock and forcing it snugly into the tapered spring so as to cause the conductor cord to be tightly gripped thereby.

27 is a spring clip rising from a base 28 screw fastened on the handle 11. This spring is so arranged that the spool 15 may be sprung into position in it or withdrawn from it by exertion of sufficient force. The upstanding portions of the clip are formed with inturned portions 29 to better retain spool 15. These upstanding, inturned portions of 29 of the clip are provided with, relatively sharp, pointed inner ends such that they will resist removal of the thimble by tending to dig into it. These inturned portions are formed by cutting the clip at an angle and then turning the points inwardly as shown in Figures 3 and 4.

The cord lock 20 is most satisfactory when made of a relatively soft rubber so that it may readily be compressed tightly against the conductor cord and securely grip the same. The purpose of bead 21 on the cord lock is to prevent, by entering between two adjacent turns of the spring, the lock from accidentally coming out should bushing 24 be displaced.

A cord anchorage constructed as described supports the cord resiliently in such manner that it may give in either direction, that is, the cord lock is resiliently connected to the anchorage.

I claim:

In an electrically operated tool having a handle, an electric conductor leading to the tool, a conductor anchorage secured to the handle, the anchorage comprising a member secured relative to the handle, a conductor protector spring member connected at one end to the member which is secured relative to the handle and constructed to serve either as a compression or tension spring, the conductor being secured to the protector spring member only adjacent the free end of the spring member and free to slide through the other end of the spring member in both directions.

WILLIAM P. LEAHY.